July 11, 1933.  W. A. MULHERN  1,918,121
LUBRICANT SEAL
Filed July 28, 1930

INVENTOR
WILLIAM A. MULHERN.
BY
*Jhing Harness*
ATTORNEY

Patented July 11, 1933

1,918,121

UNITED STATES PATENT OFFICE

WILLIAM A. MULHERN, OF DETROIT, MICHIGAN, ASSIGNOR TO CHRYSLER CORPORATION, OF DETROIT, MICHIGAN, A CORPORATION OF DELAWARE

LUBRICANT SEAL

Application filed July 28, 1930. Serial No. 471,211.

This invention relates to a sealing device and more particularly to a lubricant sealing device between a stationary member and a rotating shaft within said stationary member.

An object of this invention is to provide an improved arrangement of parts for retaining lubricant in a housing for a rotating part extending through a wall thereof and to provide in combination therewith a means which will lengthen the life of a packing member and prevent its wearing unduly.

Further objects relate to the economies of manufacture and details of construction which permit a unit assembly to be easily applied between a housing and a rotatable member extending beyond the housing.

Other objects and advantages will more fully appear from the following description taken in connection with the accompanying drawing, in which.

Figure 1:
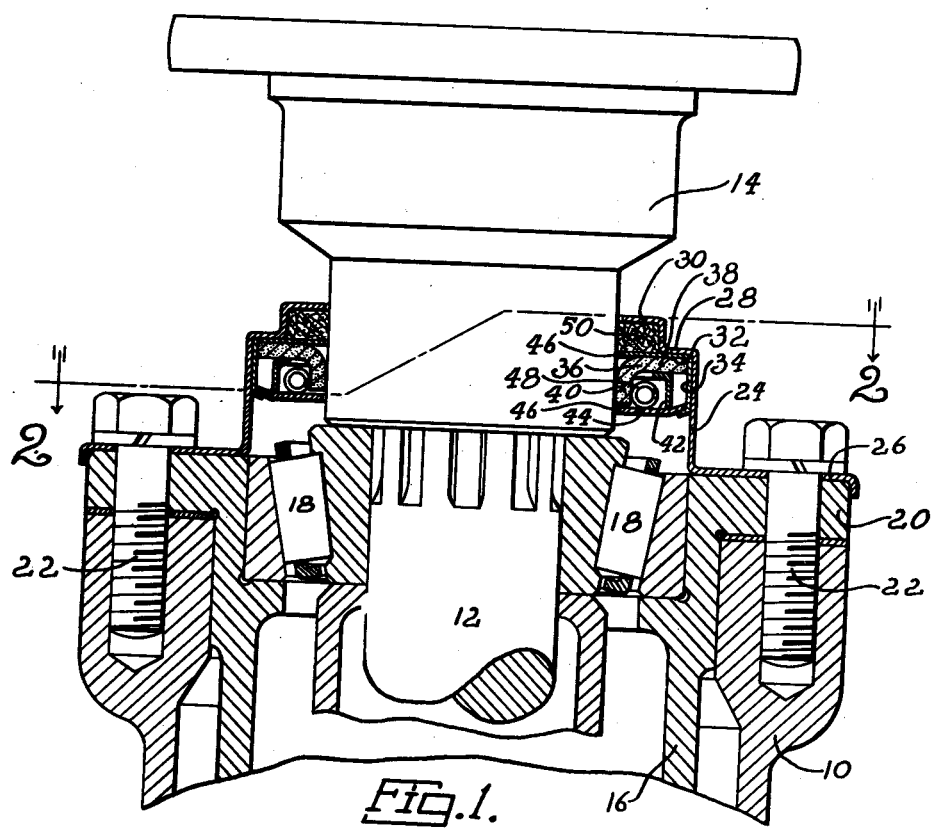
Fig. 1 is a sectional view of an automobile drive shaft housing illustrating one adaptation of my improved arrangement of parts, the driving shaft being shown in elevation.
Figure 2:
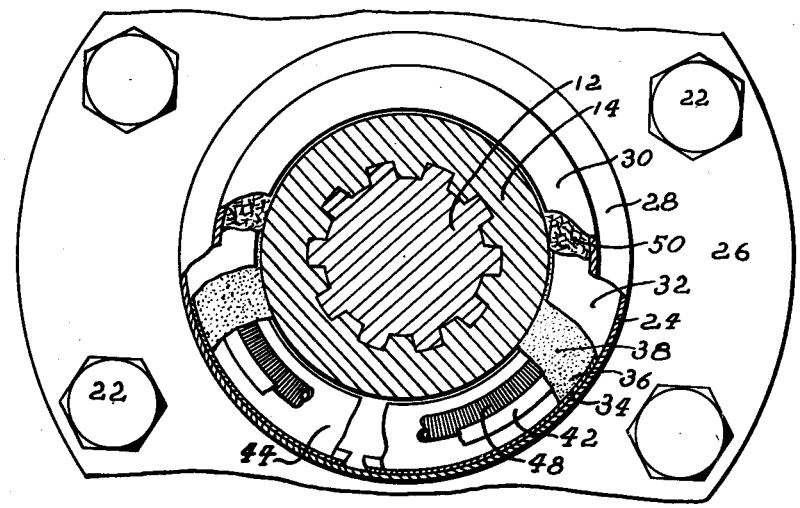
Fig. 2 is a sectional view taken on line 2—2 of Fig. 1, parts being broken away and shown in elevation.

Referring to the illustrated embodiment of my invention, the reference numeral 10 designates a portion of a rear axle housing for an automobile through which extends a drive shaft 12 having a universal joint housing 14 splined on the shaft 12. A bearing retainer 16 is adapted to fit the open end of the housing 10 and carries an anti-friction bearing 18 supporting the end of the shaft 12. The bearing retainer 16 is provided with a flange 20 which is detachably secured to the end of the housing 10 by bolts 22.

The interior of the housing 10 is supplied with lubricant and without the provision of a sealing means between the outer end of the housing 10 and the shaft 12 the lubricant passes through the anti-friction bearing 18. As a means for retaining the lubricant within the housing 10 and in the bearing 18 I have provided a sealing device in the form of a cage consisting of a cup shaped stamping 24 having a radial flange 26 adapted to be secured to the outer end of the housing 10. An inwardly extending shoulder 28 is provided in the cup member 24 to receive a lubricant sealing means, and the outer end of the cup 24 is pressed outwardly, as at 30, to form a space for receiving a member to keep out all foreign matter which would be injurious to the lubricant sealing member.

The lubricant sealing device consists primarily of three stampings, one having a radial flange 32 and a peripheral flange 34 to receive a packing member 36, preferably made of leather, formed annular in side elevation and L-shaped in cross section; that is the packing has a radially extending flange 38 and an axially extending flange 40. An L-shaped stamping 42, of smaller diameter than the flange 34, is received against the flange 38 of the packing 36 and a washer like stamping 44 engages the outer end of the stamping 42. The outer edge of the peripheral flange 34 is bent inwardly over the outer periphery of the flange 44 with a predetermined pressure such that the stamping 42 is tightly pressed against the packing 36 to hold the three stampings and packing as a unit adapted to be received in the cup like member 24.

The stampings 32 and 44 are provided with aligned axial openings 46 through which the hub of the universal joint housing 14 extends. An annular coil spring 48 is held around the axially extending flange 40 of the gasket 36 by the washer 44, the spring urging the flange 40 radially in frictional engagement with the hub of the universal joint housing 14.

In the formation of a leather gasket of the type herein illustrated, a round corner is usually formed at the outer corner of the juncture of the two flanges 38 and 40. The free edge of the flange 40 is extended toward the lubricant in preference to the round corner to form a better seal. The round corner is, therefore, on the outer side and forms a means for collecting foreign matter such as water, sand, etc. The sand is impregnated into the leather packing and acts as a means for wearing the part in engagement with the flange 40.

As a means for preventing foreign matter from being collected adjacent the round corner I have provided another sealing means, such as a textile packing 50, preferably felt, in combination with the leather sealing means. The felt packing is held in the depressed portion 30 by the flange 32.

As a means for securing the entire unit assembly to the end of the housing 10, the radial flange 26 is secured by the bolts 22 which hold the sleeve 16 within the end of the housing 10.

Various changes, including the size, shape and arrangement of parts, may be made without departing from the spirit of my invention and it is my intention to cover by my claim such changes as may be reasonably included within the scope thereof.

What I claim is:

A seal comprising a cage having axially spaced annular portions extending substantially in a radial plane, an annular member having a peripheral flange portion and a radial flange portion abutting one of the annular portions of said cage and forming an annular space between said radial flange and the other annular portion of said cage, a textile packing in the annular space provided at one side of said radial flange portion, a leather packing member abutting the opposite side of said radial flange portion having a round corner adjacent said textile packing, an annular washer like member held in position by the peripheral flange portion of said annular member, and means between said washer like member and leather packing for retaining said leather packing in sealed engagement with said radial flange portion.

WILLIAM A. MULHERN.